United States Patent Office 3,168,351
Patented Feb. 2, 1965

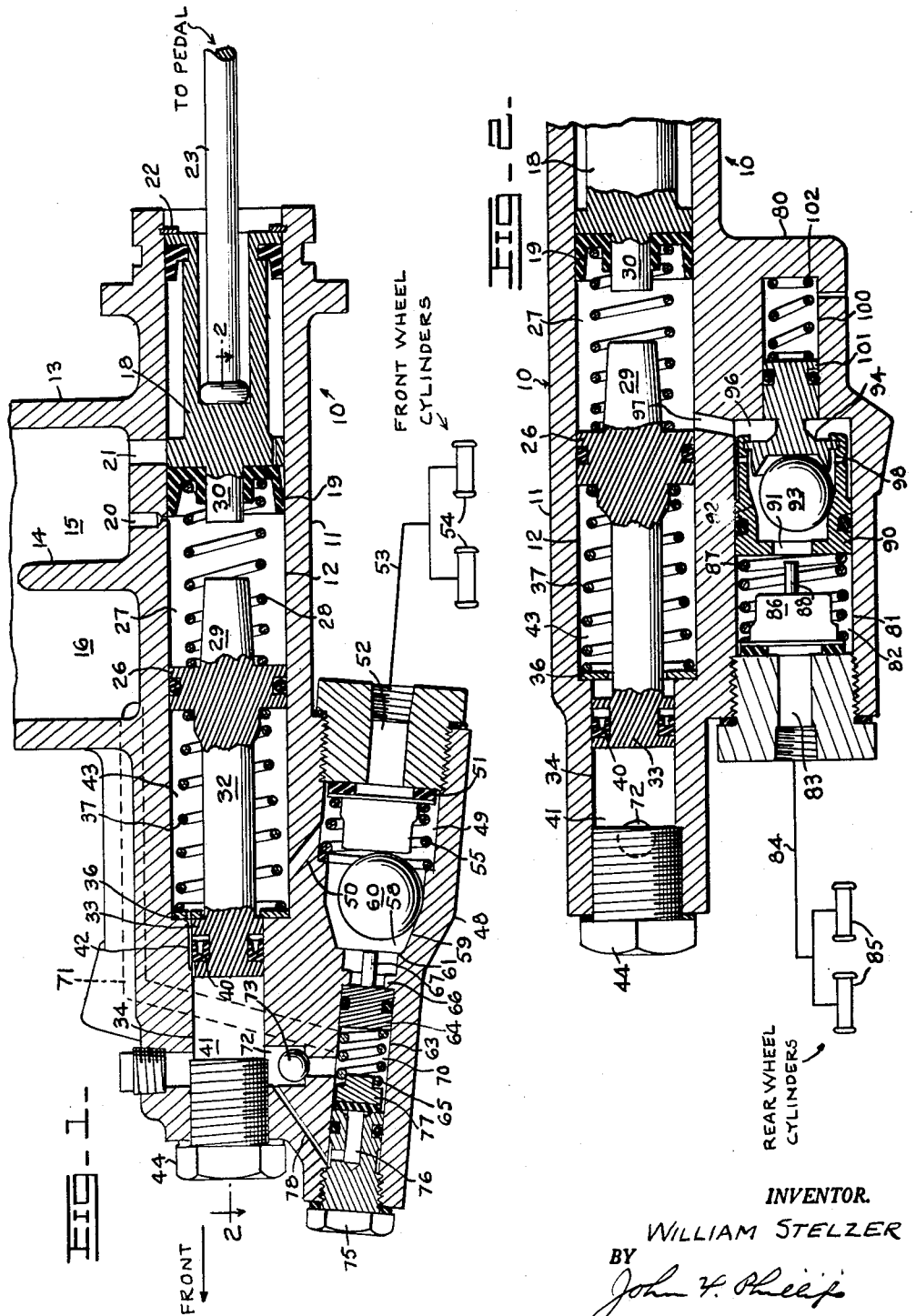

3,168,351
MOTOR VEHICLE HYDRAULIC BRAKE SYSTEM
William Stelzer, Bloomfield Hills, Mich., assignor to Kelsey-Hayes Company, Detroit, Mich., a corporation of Delaware
Filed May 5, 1961, Ser. No. 108,107
11 Claims. (Cl. 303—6)

This invention relates to a motor vehicle hydraulic brake system and has particular reference to a tandem master cylinder having two separate hydraulic circuits associated with the vehicle wheel cylinders in combination with weight transfer compensating means operable in accordance with vehicle deceleration.

It is well known that when the plunger of a vehicle master cylinder is operated to provide a high rate of vehicle deceleration, the rear wheels will lock and slide, thus losing substantial braking effect. This is due in part to the fact that under such decelerating conditions, more of the vehicle weight is thrown on the front wheels of the vehicle. While valves for reducing or limiting hydraulic pressure to the rear wheel cylinders to compensate for weight transfer occurring during vehicle deceleration have been proposed, such valves have the disadvantage that more effort is required to apply the brakes. This necessitates a higher pedal pressure or a larger power booster.

An important object of the invention is to utilize weight transfer compensating means in connection with a dual circuit master cylinder whereby the pressure supplied to the rear wheel cylinders is reduced while that supplied to the front wheel cylinders is increased in response to the deceleration of the vehicle, without increased power or manual effort.

A further object is to provide a dual master cylinder of the character referred to wherein novel means is employed, operable in accordance with vehicle deceleration, for limiting the hydraulic pressure supplied to the rear wheel cylinders.

A further object is to render the limiting of or reduction in hydraulic pressure in the rear wheel cylinders dependent on the deceleration of the vehicle and to increase the pressure to the front wheel cylinders in response to separate deceleration responsive means, whereby the starting of the operation of the two deceleration operated compensating means need not occur simultaneously but can be adapted to occur sequentially, thus providing the system with flexibility to enable it to effect a more nearly ideal distribution of braking pressures.

Other objects and advantages of the invention will become apparent during the course of the following description.

In the drawing I have shown one embodiment of the invention. In this showing:

FIGURE 1 is a longitudinal sectional view through the master cylinder and associated elements; and FIGURE 2 is a fragmentary sectional view on line 2—2 of FIGURE 1.

Referring initially to both figures of the drawing, the numeral 10 designates a cast body as a whole, a portion 11 of which forms a master cylinder having a bore 12 therein. A reservoir 13 is formed at the top of the master cylinder and is divided by a partition 14 to provide two chambers 15 and 16 from which pressure chambers to be referred to may be replenished with brake fluid.

A plunger 18 is operable in the bore 12 and is provided with a conventional seal 19 in association with the usual replenishing ports 20 and 21 communicating with the reservoir chamber 15. Movement of the plunger 18 to "off" position, shown in FIGURE 1, is limited by a snap ring 22. A push rod 23 is adapted to operate the plunger 18 and connected to the usual brake pedal (not shown) to be operated thereby, or connected to a motor mechanism.

A second plunger 26 is operable in the bore 12 and forms with the plunger 18 a pressure chamber 27 in which is arranged a spring 28 to force the two plungers 18 and 26 away from each other. The plunger 26 is provided with an axial projection 29 engageable with a projection 30 on the plunger 18 whereby the plunger 26 will be mechanically operated by the plunger 18 if a failure in pressure in the chamber 27 should occur.

The plunger 26 is provided with a stem 32 on the left-hand end of which, as viewed in FIGURE 1, is formed a smaller plunger 33 operating in a bore 34 coaxial with the bore 12. An apertured washer 36 is seated in the left-hand end of the bore 12 in FIGURE 1 and a spring 37 engages at opposite ends against the washer 36 and plunger 26 to bias the latter plunger to the right to the normal "off" position shown in FIGURE 1. The spring 37 is stronger than the spring 28 and transmits force therethrough to tend to hold the plunger 18 in its normal position.

The washer 36 acts as a stop to limit movement of the plunger or head 33 in its off position. The plunger 33 is provided with a double-lipped seal 40 to the left of which the plunger 33 is of slightly reduced diameter for the flow of fluid from a chamber 41 to the left of the plunger 33 and through a groove 42 formed in the bore 34, through the apertured washer 36 into the chamber 43 formed between the plungers 26 and 33. The bore 41 is closed by a threaded plug 44.

An enlargement 48 is formed on the casting 10 (FIGURE 1) and is provided therein with a chamber 49 communicating with the chamber 43 through a passage 50. A conventional residual valve 51 controls communication between the chamber 49 and an outlet passage 52. This passage is connected by lines 53 to the front wheel cylinders 54. The residual valve 51 is provided with the usual biasing spring 55.

A chamber 58 communicates with the chamber 49 and is provided with a conical surface 59 which obviously has its bottom sloping upwardly toward the front end of the vehicle, such end of the vehicle being indicated by the arrow and legend at the left-hand side of FIGURE 1. A ball 60 is arranged in the chamber 58 and normally gravitationally remains at its rearmost limit of movement in engagement with the residual valve 51.

Forwardly of the chamber 58 and axially alined therewith is formed a bore 63 in which is mounted a plunger 64 biased rearwardly by a spring 65 and having its movement limited by a shoulder 66. The plunger 64 has a rearwardly extending axial stem 67 engageable by the ball 60 under conditions to be described.

The spring 65 is arranged in a chamber 70 communicating through a passage 71, formed in the casting 10, with the reservoir chamber 16. A passage 72 affords communication between the chambers 41 and 70 and is normally closed by a check valve 73.

A plug 75 is threaded into the left-hand end of the bore 63 and has an axial passage 76 normally closed by a valve 77 against which one end of the spring 65 engages. The passage 76 communicates through suitable passage means 78 with the passage 72 above the ball 73. Accordingly, the passage 76 is always in communication with the chamber 41.

Referring to FIGURE 2, the numeral 80 designates an integral enlargement on the casting 10 projecting from one side thereof and provided therein with a bore 81. This bore has therein a chamber 82 communicating through a passage 83 with lines 84 leading to the rear wheel cylinders 85. Communication between the chamber 82 and the passage 83 is controlled by a conventional residual valve 86 having the usual biasing spring 87. The casing of the residual valve is provided with an axial stem 88 for a purpose to be described.

In the bore 81 is arranged a cage 90 the interior of which communicates through a port 91 with the chamber 82. Within the cage is formed a conical surface 92 over which is adapted to roll a ball 93. The cage is provided with a cap 94 secured thereto and forming with the right-hand end of the bore 81 a chamber 96 communicating with the chamber 27 through a passage 97. The outer wall of the cage 90 is apertured as at 98 for communication of the chamber 96 with the interior of the cage 90.

The enlargement 80 is provided at the right-hand end thereof with a bore 100 in which is slidable a plunger 101 fixed to the cap 94 and biased to the left by a spring 102. This spring operates in opposition to the spring 87 and the two springs referred to normally hold the cage 90 in the off position shown in FIGURE 2.

Operation

The parts normally occupy the positions shown in FIGURE 1. Upon operation of the brake pedal connected to the push rod 23, the plunger 18 moves to the left in FIGURE 1 to close the port 20 and start to build up pressure in the chamber 27. Fluid from this chamber (FIGURE 2) flows through passage 97 into chamber 96 through ports 98 and the interior of the cage 90 into the chamber 82, thence past the residual valve 86 and through lines 84 to the rear wheel cylinders to start to apply the brakes associated therewith. The body of fluid in the chamber 27 transmits movement to the plunger 26 to move it to the left in FIGURE 1 to displace fluid from the chamber 43 through the passage 50 into the chamber 49, thence past the residual valve 51 through passage 52 and lines 53 to the front wheel cylinders 54 to begin application of the front wheel brakes. Movement of the plunger 33 (FIGURE 1) to the left displaces fluid from the chamber 41, which is permitted to flow past the seal 40, whose outer lip acts as a check valve, into the chamber 43. The hydraulic pressure built up in the chamber 58, therefore, is the result of displacement of hydraulic fluid from both of the chambers 41 and 43.

The pressure built up in the chamber 58 moves the plunger 64 to compress the spring 65 which, in turn, holds the valve 77 closed. Since the hydraulic pressure on the left of the valve 77 is approximately equal to that in the chamber 58, the piston 64 is slightly larger in area than the valve 77 to maintain sufficient pressure in the chamber 70 to maintain the valve 77 seated on the end of the plug 75.

At a predetermined rate of vehicle deceleration, depending on the slope of the bottom of the conical surface 92 (FIGURE 2), the ball 93 will move forwardly or to the left to close the port 91, thus closing communication between the interior of the cage 90 and the chamber 82. When this operation occurs, the cage 90, functioning as a plunger, will have been displaced to the right in FIGURE 2 to some extent by pressure in the chamber 82. After the ball 93 closes the port 91, any further displacement of fluid from the chamber 27 into the chamber 96 moves the cage 90 to the left to increase the pressure in the chamber 82. The area of the left-hand end of the plunger 101 is subject to pressure in the chamber 96 and counteracts pressure acting to the right against an equal area of the right-hand end of the cage 90. Thus pressure acting in the chamber 96 to move the cage 90 to the left in FIGURE 2 produces a pressure in the chamber 82 lower than pressure in the chamber 96 and in the master cylinder chamber 27. Obviously this pressure can progressively increase as pressure in the master cylinder chamber increases, but is always lower than such pressure.

At the same time the ball 93 closes the port 91, or at a different time during vehicle deceleration depending on the inclination of the bottom of the conical surface 59, the ball 60 moves forwardly or to the left in FIGURE 1 to engage the seat 61. By the time this operation occurs, the plunger 64 will have moved to the left against the tension of the spring 65, hence the stem 67 does not interfere with the seating of the ball 60. This extension serves to prevent premature seating of the ball 60. The seating of the ball 60 "freezes" the spring 65 so that no further loading of this spring can take place. Upon a further increase in hydraulic pressure in the chambers 43 and 41, the pressure increase in the latter causes the valve 77 to relieve the additional pressure so that from there on, hydraulic pressure in the chamber 41 remains constant and the pressure in the chamber 43 is increased relative to the hydraulic pressure in the chamber 27. This is due to the fact that in this stage of the operation, the higher pressure in the chamber 43 than in the chamber 41 prevents bypassing fluid from the chamber 41 to the chamber 43 around the cup 40. Thus the plunger 33 ceases to displace fluid to the front wheel cylinders. At this time it will be understood that the volumetric displacement of fluid from the chamber 49 to the front wheel cylinder has engaged the front wheel brakes. From this point on, the displacement of fluid from the chamber 43 will be determined in proportion to the area of the plunger 26 minus the area of the plunger 33. Thus a slower flow of fluid will take place into the chamber 49, but at a higher pressure. In other words, a smaller volume of fluid will be displaced from the chamber 43 for a given axial movement of the plunger 26.

Fluid relieved from the chamber 41 around the valve 77 is free to flow through passage 71 to the reservoir chamber 16. The relieving of pressure from the chamber 41 relieves pressure acting to the right against the plunger 33, thus permitting the plunger 26 to generate higher pressure in the chamber 43.

Thus there are three different hydraulic pressures in the system, namely an intermediate pressure in the chamber 27 which will be proportional to pedal reaction, an increased pressure in the chamber 43 and in the front wheel cylinders, and a lower pressure in the chamber 82 and in the rear wheel cylinders. The higher and lower pressures respectively in the chambers 43 and 27 can be progressively increased by progressively greater pedal pressures or by progressively increased booster motor forces if the rod 23 is operated by a motor.

It will be noted that an accidental or premature seating of the ball 93 causes maximum travel of the cage 90 to the left. This results in the tripping or unseating of the ball 93 by the axial extension 88, thus preventing an unwanted blocking off of the rear wheel cylinders during a brake application.

When the brake pedal is released, a drop in pressure occurs in the chambers 27 and 96, cage 90 moves to the right, and ball 93 unseats when the position is reached where the ball seated while the brakes were being applied. After ball 93 is unseated due to the equalization of pressure on the two sides of the ball, cage 90 will move slightly to the left due to spring 102 to assume the original "off" position as shown in FIGURE 2. The relieving of the pressure in the chamber 27 permits the plunger 26 to be returned to its normal position and the pressure in the chamber 41 becomes atmospheric, there being a free flow of fluid from the reservoir chamber 16 through passage 71 into the chamber 70 and thence upwardly around the ball 73 into the chamber 41. At the end of the return strokes of the plungers 26 and 33, the chambers 41 and 43 will communicate with each other through the groove 42.

From the foregoing, it will be apparent that the present system is highly effective for limiting brake pressures to the rear wheels whenever the rate of vehicle deceleration is sufficiently great to move the ball 93 to a position closing the port 91. If the rate of vehicle deceleration is not sufficiently high to seat the ball 93, fluid will be delivered to the rear wheels from the chamber 27 around the ball 93 at the same pressure as is present in the chamber 27. During a normal brake application in which the deceleration rate is not sufficient to seat the ball 60, progressively increasing pressures from the chamber 43 acting on the piston 64 will move this piston to progressively compress the spring 65. This progressive loading of the spring 65 prevents the opening of the valve 77, and accordingly the front wheel cylinders will be supplied with pressure from both of the chambers 43 and 41. Thus in normal operation, the same braking pressures will be delivered to the front and rear wheel cylinders from the chambers 43 and 27 respectively. However, under substantial rates of vehicle deceleration the system functions to limit rear wheel cylinder pressures to a point below pressures in the chamber 27 and provide front wheel braking pressures higher than pressures developed in the chamber 27.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a hydraulic brake system for a motor vehicle having a plurality of wheel cylinders, a master cylinder having a pair of plungers therein defining therebetween a first pressure chamber, a duct connecting such pressure chamber with certain of said wheel cylinders, the side of one of said plungers opposite said pressure chamber forming with the adjacent end of said master cylinder a second pressure chamber communicating with the other wheel cylinders, means for supplying force to the other plunger to displace fluid from said one chamber through said duct to said certain wheel cylinders and to transmit movement to said one plunger to displace fluid from said second chamber to the other wheel cylinders, and a device in said duct normally operative for passing fluid therethrough from said first chamber to said certain wheel cylinders, said device comprising an auxiliary cylinder, a piston in such cylinder, one end of said auxiliary cylinder communicating with said first pressure chamber and the other end communicating with said certain wheel cylinders, said piston being hollow and having a downwardly and rearwardly sloping lower surface, a ball valve arranged on said surface, said piston having a port communicating with said other end of said auxiliary cylinder, said ball being movable upwardly along said surface to close said port upon a predetermined rate of vehicle deceleration, and a plunger connected to said piston and having a relatively small surface facing into said first-named end of said cylinder whereby, when said ball engages said seat, pressure in one end of said auxiliary cylinder acts to move said piston to displace fluid from said other end of said auxiliary cylinder, and said small surface subtracts from the pressure supplied from said first pressure chamber to move said piston whereby pressure in said other end of said auxiliary cylinder will be less than pressure in said first chamber.

2. In a hydraulic brake system for a motor vehicle having a plurality of wheel cylinders, a master cylinder having a pair of plungers therein defining therebetween a first pressure chamber communicating with certain of said wheel cylinders, the side of one of said plungers opposite said pressure chamber forming with the adjacent end of said master cylinder a second pressure chamber communicating with the other wheel cylinders, means for supplying force to the other plunger to displace fluid from said first pressure chamber into said certain wheel cylinders, fluid in said first pressure chamber constituting the sole means to transmit movement to said one plunger, upon movement of said other plunger, to displace fluid from said second pressure chamber to said other wheel cylinders, means responsive to a predetermined rate of vehicle deceleration for cutting off communication between said first pressure chamber and said certain wheel cylinders, and means rendered operative by the cutting off of said communication for utilizing pressure in said first pressure chamber for supplying hydraulic pressure to said certain wheel cylinders at a pressure lower than, but proportional to, pressure in said first pressure chamber, and means responsive to a predetermined degree of vehicle deceleration for increasing the effective pressure in said second chamber delivered to said other wheel cylinders.

3. In a hydraulic brake system for a motor vehicle having a plurality of wheel cylinders, a master cylinder having a pair of plungers therein defining therebetween a first pressure chamber communicating with certain of said wheel cylinders, the side of one of said plungers opposite said pressure chamber forming with the adjacent end of said master cylinder a second pressure chamber communicating with the other wheel cylinders, a second cylinder having a smaller plunger therein connected to said one plunger and connected for supplying fluid to said other wheel cylinders, means for supplying force to the other plunger of said pair to displace fluid from said one pressure chamber into said certain wheel cylinders and to transmit movement to said one plunger and to said smaller plunger to displace fluid to said toher wheel cylinders, means operative upon a predetermined rate of vehicle deceleration for rendering said smaller plunger ineffective for supplying fluid to said other wheel cylinders whereby only said one plunger of said pair supplies fluid to said other wheel cylinders at a lower volume and higher pressure, and means operative upon a predetermined rate of vehicle deceleration for cutting off communication between said first pressure chamber and said certain wheel cylinders and for utilizing pressure in said one pressure chamber for supplying hydraulic pressure to said certain wheel cylinders at a pressure lower than, but proportional to, pressure in said first pressure chamber.

4. In a hydraulic brake system for a motor vehicle having a plurality of wheel cylinders, a master cylinder having a pair of plungers therein defining therebetween a first pressure chamber, a duct connecting said first pressure chamber with certain of said wheel cylinders, the side of one of said plungers opposite said pressure chamber forming with the adjacent end of said master cylinder a second pressure chamber communicating with the other wheel cylinders, a second cylinder having a smaller plunger therein connected to said one plunger and connected for supplying fluid to said other wheel cylinders, means for supplying force to the other plunger of said pair to displace fluid from said one pressure chamber into said certain wheel cylinders and to transmit movement to said one plunger and to said smaller plunger to displace fluid to said other wheel cylinders, means operative upon a predetermined rate of vehicle deceleration for rendering said smaller plunger ineffective for supplying fluid to said other wheel cylinders whereby only said one plunger of said pair supplies fluid to said other wheel cylinders at a lower volume and higher pressure, and a device in said duct normally operative for passing fluid therethrough from said first chamber to said certain wheel cylinders, said device comprising inertia means operative upon a predetermined rate of vehicle deceleration for closing communication through said duct and for causing said device to act as means responsive to pressure in said first chamber for moving it to displace fluid from said duct into said certain wheel cylinders, said device having pressure areas subject to pressure in said first chamber to provide a net pressure for moving said device, which is less than the pressure in said first chamber, to reduce the pressure delivered to said certain wheel cylinders below the pressure in said first pressure chamber.

5. In a hydraulic brake system for a motor vehicle having a plurality of wheel cylinders, a master cylinder having a pair of plungers therein defining therebetween a first pressure chamber, a duct connecting said first pressure chamber with certain of said wheel cylinders, the side of one of said plungers opposite said pressure chamber forming with the adjacent end of said master cylinder a second pressure chamber communicating with the other wheel cylinders, a second cylinder having a smaller plunger therein connected to said one plunger and connected for supplying fluid to said other wheel cylinders, means for supplying force to the other plunger of said pair to displace fluid from said one pressure chamber into said certain wheel cylinders and to transmit movement to said one plunger and to said smaller plunger to displace fluid to said other wheel cylinders, means operative upon a predetermined rate of vehicle deceleration for rendering said smaller plunger ineffective for supplying fluid to said other wheel cylinders whereby only said one plunger of said pair supplies fluid to said other wheel cylinders at a lower volume and higher pressure, and a device in said duct normally operative for passing fluid therethrough from said first chamber to said certain wheel cylinders, said device comprising a cylinder having a piston therein and provided with a port, an inertia member operative upon a predetermined rate of vehicle deceleration to close said port and close communication through said duct whereby pressure in said one chamber moves said piston to displace fluid from its cylinder into said certain wheel cylinders, said device having a pressure area acting in opposition to movement of said piston by pressure in said one chamber whereby said piston delivers to said certain wheel cylinders a pressure below the pressure in said first pressure chamber.

6. In a hydraulic brake system for a motor vehicle having a plurality of wheel cylinders, a master cylinder having a pair of plungers therein defining therebetween a first pressure chamber communicating with certain of said wheel cylinders, the side of one of said plungers opposite said pressure chamber forming with the adjacent end of said master cylinder a second pressure chamber communicating with the other wheel cylinders, a second cylinder having a smaller plunger therein connected to said one plunger and connected for supplying fluid to said other wheel cylinders, means for supplying force to the other plunger of said pair to displace fluid from said one pressure chamber into said certain wheel cylinders and to transmit movement to said one plunger and to said smaller plunger to displace fluid to said other wheel cylinders, means operative upon a predetermined rate of vehicle deceleration for rendering said smaller plunger ineffective for supplying fluid to said other wheel cylinders whereby only said one plunger of said pair supplies fluid to said other wheel cylinders at a lower volume and higher pressure, a device in said duct normally operative for passing fluid therethrough from said first chamber to said certain wheel cylinders, said device comprising an auxiliary cylinder, a piston in such cylinder, one end of said auxiliary cylinder communicating with said first pressure chamber and the other end communicating with said certain wheel cylinders, said piston being hollow and having a downwardly and rearwardly sloping lower surface, a ball valve arranged on said surface, said piston having a port communicating with said other end of said auxiliary cylinder, said ball being movable upwardly along said surface to close said port upon a predetermined rate of vehicle deceleration, and a plunger connected to said piston and having a relatively small surface facing into said first-named end of said cylinder whereby, when said ball engages said seat, pressure in one end of said auxiliary cylinder acts to move said piston to displace fluid from said other end of said auxiliary cylinder, and said small surface subtracts from the pressure supplied from said first pressure chamber to move said piston whereby pressure in said other end of said auxiliary cylinder will be less than pressure in said first chamber.

7. In a hydraulic brake system for a motor vehicle having a plurality of wheel cylinders, a master cylinder having a pair of plungers therein defining therebetween a first pressure chamber communicating with certain of said wheel cylinders, the side of one of said plungers opposite said pressure chamber forming with the adjacent end of said master cylinder a second pressure chamber communicating with the other wheel cylinders, means for supplying force to the other plunger to displace fluid from said first pressure chamber into said certain wheel cylinders and to transmit movement to said one plunger to displace fluid from said second pressure chamber to said other wheel cylinders, means responsive upon a predetermined rate of vehicle deceleration for reducing the pressure supplied to said certain wheel cylinders from said first pressure chamber, and means controlled in accordance with a predetermined rate of vehicle deceleration for increasing the pressure supplied from said second pressure chamber to said other wheel cylinders.

8. In a hydraulic brake system for a motor vehicle having a plurality of wheel cylinders, master cylinder and plunger means defining with said master cylinder a pair of hydraulic pressure chambers, one of which is connected to certain wheel cylinders and the other of which is connected to the other wheel cylinders, means for applying force to said plunger means to generate in said pressure chambers pressures proportional to the force applied to said plunger means, and means controlled in accordance with a predetermined rate of vehicle deceleration for rendering a given force applied to said plunger means effective for increasing the pressure in one of said pressure chambers to increase the hydraulic pressure applied to the wheel cylinders connected thereto.

9. In a hydraulic brake system for a motor vehicle having a plurality of wheel cylinders, a master cylinder having a pair of plungers therein defining therebetween a first pressure chamber communicating with certain of said wheel cylinders, the side of one of said plungers opposite said pressure chamber forming with the adjacent end of said master cylinder a second pressure chamber communicating with the other wheel cylinders, a second cylinder having a smaller plunger therein connected to said one plunger and connected for supplying fluid to said other wheel cylinders, means for supplying force to the other plunger of said pair to displace fluid from said one pressure chamber into said certain wheel cylinders and to transmit movement to said one plunger and to said smaller plunger to displace fluid to said other wheel cylinders, and means controlled in accordance with a predetermined rate of vehicle deceleration for rendering said smaller plunger ineffective for supplying fluid to said other wheel cylinders whereby only said one plunger of said pair supplies fluid to said other wheel cylinders at a lower volume and higher pressure.

10. In a hydraulic brake system for a motor vehicle having a plurality of wheel cylinders, a master cylinder having a pair of plungers therein defining therebetween a first pressure chamber communicating with certain of said wheel cylinders, the side of one of said plungers opposite said pressure chamber forming with the adjacent end of said master cylinder a second pressure chamber communicating with the other wheel cylinders, a second cylinder having a smaller plunger therein connected to said one plunger and connected for supplying fluid to said other wheel cylinders, means for supplying force to the other plunger of said pair to displace fluid from said one pressure chamber into said certain wheel cylinders and to transmit movement to said one plunger and to said smaller plunger to displace fluid to said other wheel cylinders, and means for bypassing fluid from said second cylinder away from said other wheel cylinders when pressure in said second cylinder increases to a predetermined point, thus rendering said smaller plunger ineffective for supplying fluid to said other wheel cylinders whereby only said one plunger of said pair supplies fluid to said other wheel cylinders at a lower volume and higher pressure.

11. In a hydraulic brake system for a motor vehicle having a plurality of wheel cylinders, a master cylinder having a pair of plungers therein defining therebetween a first pressure chamber communicating with certain of said wheel cylinders, the side of one of said plungers opposite said pressure chamber forming with the adjacent end of said master cylinder a second pressure chamber communicating with the other wheel cylinders, a second cylinder having a smaller plunger therein connected to said one plunger and connected for supplying fluid to said other wheel cylinders, means for supplying force to the other plunger of said pair to displace fluid from said one pressure chamber into said certain wheel cylinders and to transmit movement to said one plunger and to said smaller plunger to displace fluid to said other wheel cylinders, a reservoir, a bypass duct between said second cylinder and said reservoir, a check valve in said bypass duct, a spring seating said check valve to tend to prevent passage of fluid from said second cylinder to said reservoir, means operative by pressure in said second pressure chamber for progressively increasing the loading of said spring to tend to prevent opening of said check valve upon progressively increasing pressures in said second cylinder, and means responsive to a predetermined rate of vehicle deceleration for limiting the loading of said spring whereby said check valve will open to render said smaller piston ineffective for supplying fluid to said other wheel cylinders and only said one plunger will supply fluid to said other wheel cylinders at a lower volume and higher pressure.

References Cited in the file of this patent

UNITED STATES PATENTS

| | | |
|---|---|---|
| 1,943,886 | Carroll | Jan. 16, 1934 |
| 2,239,955 | Freeman | Apr. 29, 1941 |
| 2,242,297 | Freeman | May 20, 1941 |
| 2,835,271 | Oberthur | May 20, 1958 |

FOREIGN PATENTS

| | | |
|---|---|---|
| 732,955 | Great Britain | June 29, 1955 |